United States Patent [19]

Avaneas

[11] Patent Number: 4,827,477
[45] Date of Patent: May 2, 1989

[54] BUS INTERFACE UNIT

[75] Inventor: Napoleon G. Avaneas, Kings Park, N.Y.

[73] Assignee: Grumman Aerospace Corporation, Bethpage, N.Y.

[21] Appl. No.: 50,758

[22] Filed: May 15, 1987

[51] Int. Cl.4 ............................................ G06F 11/10
[52] U.S. Cl. ......................................... 371/37; 371/49
[58] Field of Search ................. 371/37, 49, 8; 370/88, 370/89; 340/825.05, 825.16; 364/200 MS File, 900 MS File

[56] References Cited

U.S. PATENT DOCUMENTS

| | | | |
|---|---|---|---|
| 4,136,384 | 1/1979 | Okada | 364/200 |
| 4,271,518 | 6/1981 | Birzele | 364/200 X |
| 4,501,021 | 2/1985 | Weiss | 370/88 X |
| 4,574,375 | 3/1986 | Kemp | 370/85 X |
| 4,577,313 | 3/1986 | Sy | 371/37 X |
| 4,607,345 | 8/1986 | Mehta | 364/900 |

OTHER PUBLICATIONS

P. Bushell, "CRCC Calculation by Software", Electronic Engineering, p. 17, Aug. 1976.
Andrew S. Tanenbaum, "Computer Networks", date unknown, Prentice-Hall, Inc., Englewood Cliffs, NJ 07632 pp. 122 to 133.
Fairchild Camera and Instrument Corporation, "FAST-Fairchild Advanced Schottky TTL", 1984, pp. 4-271 to -284.

Primary Examiner—Jerry Smith
Assistant Examiner—Robert W. Beausoliel
Attorney, Agent, or Firm—Richard G. Geib; Daniel Jay Tick; Bernard S. Hoffman

[57] ABSTRACT

A bus interface unit for interfacing a serial bit data bus to a parallel bit data handling system includes a receiver for acquiring serial data from the bus. A clock generates a clock signal at a frequency corresponding to frequency of bits in the serial data. A clock processor receives the serial data and the clock signal to generate a clock processor signal for processing the serial data. A serial to parallel converter responsive to the serial data and the clock processor signal converts the serial data to parallel bit data. An output driver provides the parallel bit data to the parallel bit data handling system. A frame check sequence tester responsive to the serial data and the clock signal provides a validity output signal when the frame check sequence is recognized by the tester. The tester includes a plurality of devices operating in parallel to increase speed. A serial to parallel converter converts data received from the parallel bit data handling device to serial form data. The parity of the parallel data is checked. A frame check sequence generator of essentially the same configuration as the tester provides a word based on the content of the data which is altered if the parity is incorrect. A transmitter places the serial form data and the frame check sequence word on the data bus.

15 Claims, 8 Drawing Sheets

MESSAGE FORMATS

INTERPORT BROADCAST MESSAGE FORMAT

INTERPORT SINGLE DESTINATION MESSAGE FORMAT

USER MESSAGE BROADCAST MULTICAST OR SINGLE DESTINATION FORMAT

SD = START DELIMETER (1 BIT)
IUM = INTERPORT/USER MESSAGE FLAG (1 BIT)
RF = MESSAGE REPEAT FLAG (1 BIT)
SRA = SOURCE RING ADDRESS (2 BITS)
SA = SOURCE ADDRESS (12 BITS)
IB = INSERTED BIT (1 BIT)
BF = BROADCAST FLAG (1 BIT)
DAF = DESTINATION PHYSICAL/LOGICAL ADDRESS FLAG (1 BIT)
DRA = DESTINATION RING ADDRESS (2 BITS)
DA = DESTINATION ADDRESS (12 BITS)
OC = OPERATION CODE (14 BITS)
FCS = FRAME CHECK SEQUENCE (16 BITS)
CRW = COMMAND/RESPONSE WORD (0 TO 128 16-BIT WORDS)
DT = USER'S DATA (1 TO 512 16-BIT WORDS)
ED = END OF MESSAGE DELIMITER (1 BIT)

Fig. 7

BUS INTERFACE UNIT

CROSS REFERENCES TO RELATED APPLICATIONS

The following applications of the same inventor as that of the subject matter of the present application, and assigned to the same assignee, are relevant to the subject matter of this application.

"Hybrid High Speed Data Bus," Ser. No. 599,113, filed Apr. 11, 1984, and now abandoned.

"High Speed Data-Clock Synchronization Processor", Ser. No. 000,504, filed Jan. 5, 1987.

BACKGROUND OF THE INVENTION

The present invention relates to systems for interfacing a host computer to a high speed Local Area Network (LAN). More particularly, it relates to bus interface units for interfacing a host computer having a parallel bit output to a data bus carrying a plurality of messages serially. The bus interface unit is part of the apparatus called a port which is the device connecting the bus and a host computer.

The connection of a number of host computers to a data bus presents no special difficulties if speed of transmission is not of great importance. Appropriate signals may be placed on to the bus so that collisions between messages do not occur. Further, if immediate processing is not essential, error checking of the information on the bus is performed by having a subsequent message instruct a receiver to ignore a prior message, or by conducting an error checking routine after a full message has been stored in a buffer but before it is transmitted. However, such approaches are not suitable for the transmission of data at extremely high rates and in real time applications such as aircraft systems, where the information transmitted on the bus must be acted upon promptly and processing delays are not acceptable.

BRIEF SUMMARY OF THE INVENTION

It is a principle object of the invention to provide a Bus Interface Unit (BIU) for interfacing a host computer through appropriate hardware to a high speed LAN.

It is another object of the invention to provide a system for converting parallel bit data to and from serial data for transmission on a bus carrying serial data at a high bit rate.

It is still another object of the invention to provide apparatus for interfacing a system operating with parallel bit data to a serial bit data network where the apparatus checks the parity of the data as it is being placed on the serial bus of the network and generates parallel data and an appropriate parity bit from the received serial data.

It is yet another object of the invention to provide an apparatus for interfacing a system operating with parallel bit data to a serial bit data network and/or an apparatus operating with serial data to a parallel data network with Frame Check Sequence (FCS) information as the last word of a transmitted or received message, so as to establish error-free transmission by comparing the transmitted and the generated FCS at the receiver.

In accordance with the invention, a bus interface unit for interfacing a serial bit data bus to a parallel bit data handling system, comprises a receiver means for acquiring serial data from the bus; a clock means for generating a clock signal at a frequency equal to the data rate of the serial data; a clock processor means for receiving the serial data and the clock signal to generate a clock processor signal for processing the serial data: a serial to parallel data conversion means responsive to the serial data and the clock processor signal for converting the serial data to parallel bit data; and an output means for outputting the parallel bit data to the parallel bit data handling system.

The serial data contains an FCS word as the last word of each message. The bus interface unit further comprises an FCS generator/tester responsive to the serial data and the clock processor signal for providing a validity output signal when the frame check sequence is recognized by the tester. The frame check sequence tester includes parallel processing means to increase its speed.

The bus interface unit further comprises a parity generator for generating a parity bit representative of the parity of each parallel bit data word generated from the received serial data.

The bus interface unit also further comprises a transmission means for placing the serial data received from the data bus back on the data bus. The transmission means comprises a timing control responsive to the clock signal for producing timing signals; an output data selector responsive to the timing signals and the serial data for producing a serial data train: and a transmitter responsive to the serial data train for placing the data train on the serial bus. An input means for receiving input parallel bit data from the data handling system; a parallel to serial converter responsive to the timing signals and the input parallel bit data for converting the input parallel bit data into converted serial data; and a transmission means for placing the converted serial data on the data bus are also included.

The BIU also includes a parity tester responsive to the timing signals and the parallel data for testing the parity of the parallel data before it is converted into a serial form and for providing a parity output indicative of whether the parity is correct. An FCS generator is responsive to the timing signals and the serial data. The FCS generator generates a test word. The FCS generated in the receiver indicates an error-free data reception if it is identical to the FCS word generated in the transmitter and has been transmitted as the last word of the received data block.

The FCS generator and FCS tester each comprise a plurality of shift registers for producing shifted output data. The shift registers include a first shift register and successive shift registers. An input data selector means selects input data for the first shift register. A successive data selector means is provided for each of the successive shift registers. Each successive data selector means selects data to be input to a next one of the successive shift registers. Each successive data selector means has a first input for receiving the input data, and a second input. Cross connecting means are provided for each successive data selector means. The cross connecting means connect shifted output data from one of said shift registers to the second input of a one of the successive data selectors associated with the next successive shift register. A control means responsive to shifted output data from a last of said successive shift registers for controlling the input data selector means and for controlling the successive data selector means to connect one of the input data and the shifted output data from a previous one of the shift registers as input to one of the successive shift registers, is also provided.

BRIEF DESCRIPTION OF THE DRAWINGS

In order that the invention may be more readily carried into effect, reference is made to the accompanying drawings, wherein:

FIG. 4, which consists of FIGS. 4A and 4B, is a logic diagram of the TTL to ECL translator, the parallel to serial data converter, the parity tester and the output data selector of FIG. 1;

DETAILED DESCRIPTION OF THE PREFERRED EMBODIMENT

The present invention is preferably implemented by using an optical data transmission medium between stations in a network, as there are thus no capacitance loading effects on the data represented on the medium by very short pulses. However, if a lower speed version is desirable, an electrical transmission medium could be used.

Figure 1:
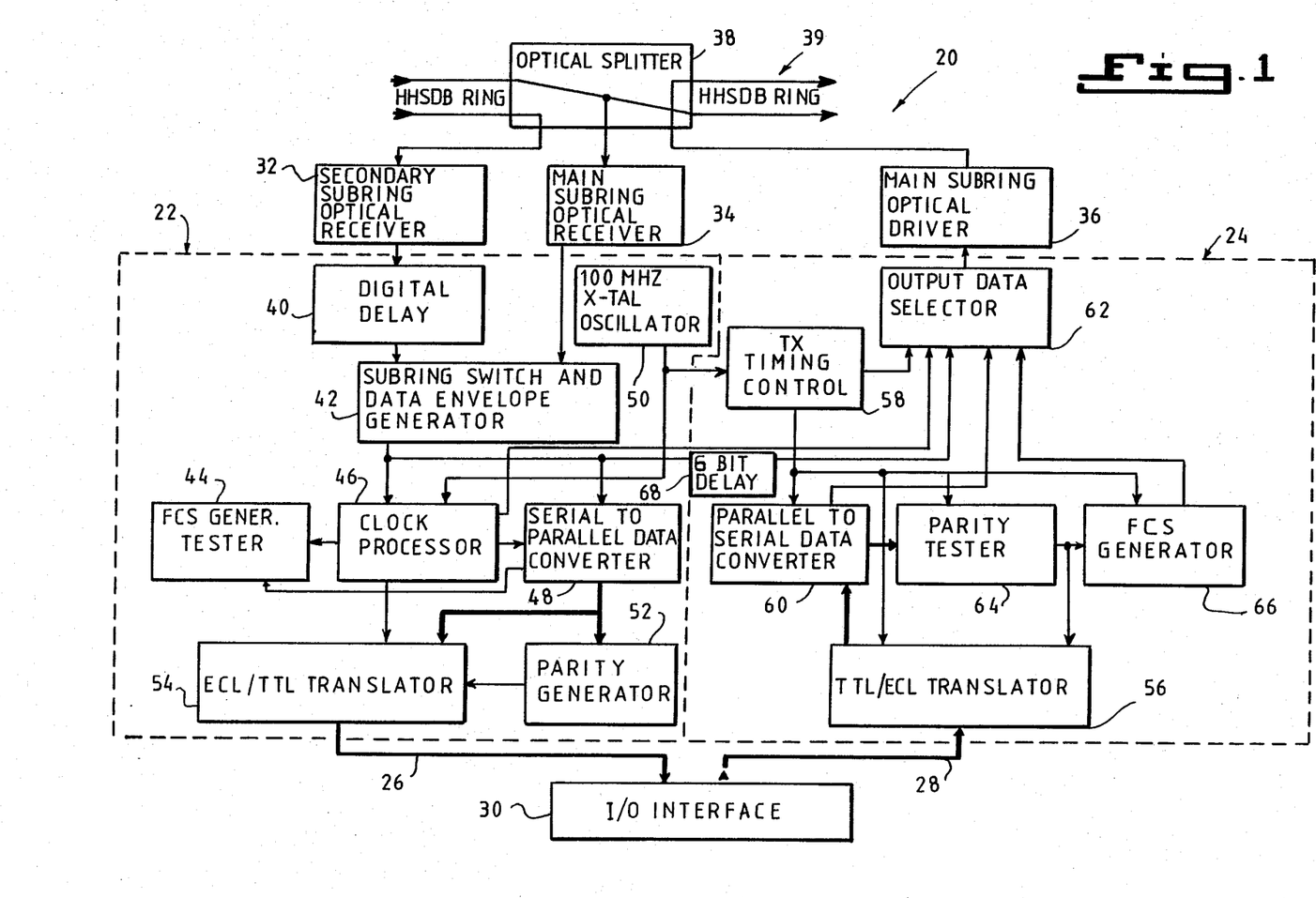
FIG. 1 is a block diagram of a BIU according invention, connected to a dual ring data bus and a host computer or I/O interface.

Referring to FIG. 1, the BIU 20 of the present invention comprises, broadly, a receiver section 22 and a transmitter section 24. Receiver section 22 and transmitter section 24 are both connected by respective parallel data buses 26 and 28 to an I/O interface 30 interfacing with a host computer. I/O interface 30 includes the appropriate parallel bit data handling capability for interfacing data from bus interface unit 20 to a host computer or another network, as more fully described below.

Receiver section 22 is connected to electro-optical transducers which include a secondary subring optical receiver 32, and a main subring optical receiver 34. Transmitter section 24 is connected to a main subring optical driver 36. These three electro-optical components and an optical splitter 38 are components of a data bus 39 such as the Hybrid High Speed Data Bus described in the abovementioned U.S. patent application Ser. No. 599,133, which serve to connect bus interface unit 20 thereto. A system which also uses two optical subrings but operates on different principles is described in U.S. Pat. No. 4,545,074 to Balliet et al.

While the details of operation of the abovementioned electro-optical components in relation to data bus 39 are set forth in the abovementioned application, it is noted that the arrangement offers fault-tolerant operation. In other words, data bus 39 continues to operate when a port or a path of the physical medium fails. The physical medium is formed in a ring topology consisting of two unidirectional non-redundant subrings transmitting data in the same direction. A port transmits only on one of the two subrings, whereas the next port in sequence transmits only on the other subring. This process is repeated throughout the ring. On the other hand, every port is able to receive messages from either of the two subrings. Each subring consists of sections, each of which originates from the transmitter of a port and terminates at the receiver of the second port in sequence after the originator. In the vicinity of the next port, the section is passively split, by optical splitter 38, and the newly generated path is terminated at a receiver of this port.

Both subrings are of equal importance to each port for bringing a message into the port; i.e., the subring bringing the message first is selected by the port for the reception of the message, while the other is ignored until the message has been totally received. The received message, no matter from which subring it came, is retransmitted to the port's subring. This approach guarantees that the same message is generated at all times on both subrings even after a port or subring failure. Although both subrings are of equal importance, a switchable digital delay line 40 associated with the subring section which originated at the n−2 port limits the difference in the data arrival time from the two subrings to a 4–6 bit intervals and thus gives preference to data from the subring arriving from the n−1 port (from main subring optical receiver 34). This arrangement guarantees that the subring of the previous port (or node) is always selected, except in case of a failure of the previous port or the path from the previous port. In either case the other subring is selected automatically without delay.

The instantaneous detection and recovery from a fault makes this topology exceptionally suitable for real-time operation applications.

Thus, data being transmitted optically on the main subring is converted into electrical impulses by main subring optical receiver 34. Optical data transmitted on the secondary subring, at the same data rate, is converted into electrical impulses by secondary subring optical receiver 32 and, in sequence, is delayed by a digital delay 40 which provides, a delay of 4–6 bit intervals. The outputs of both main subring optical receiver 34 and digital delay 40 are provided as inputs to subring switch and data envelope generator 42, which perform two primary functions. First, as outlined above, a selection is made as to whether data from the main subring or the secondary subring will be used. In addition, a data envelope is generated; that is a logic signal is provided which is coincident with the reception of data from the selected subring, i.e., coincident with the actual data which enters the generator 42.

The data selected and the data envelope generated by generator 42 are fed to a clock processor 46. The data envelope is also sent to the I/O interface 30 realizing the protocol (discussed below) outside of the BIU.

Clock processor 46 in addition to the selected data and data envelope receives a clock signal from a crystal oscillator 50 which has a frequency equal to the data rate. The accuracy of crystal oscillator 50 should preferably be in the order of 0.001 percent, thus guaranteeing error-free data reception of data blocks o at least 16,384 bits with a bit error rate of less than $10^{-9}$ and undistorted retransmission of the messages independently of the number of ports connected to the data bus ring. Clock processor 46 permits non-return to zero (NRZ) data exchange between two or more devices at the maximum possible speed permitted by the digital electronics without any additional requirements of timing information exchange. A receiving device using clock processor 46 has the capability of deriving an optimum (for the received data) clock-phase from the clock signal from crystal oscillator 50, to strobe the receive data into a register, for example, into the serial to parallel data converter 48 without any loss of information up to the maximum size of a message defined by the accuracy of the clock and the logic components used.

Clock processor 46, as fully described in the above mentioned U.S. patent application Ser. No. 005,504, is advantageous in that it permits:

(1) Uncoded data to be placed onto a transmission medium. As such, the data rate can reach the bandwidth of the transmission medium; and (2) The receiver, at the beginning of each received data block, to select a phase of its own crystal clock for purposes of receiving and retransmitting the data. The selected clock phase used remains fixed for the entire receive/retransmit operation. By using a fixed data clock, the receiver places a new signal on the medium when the received data is retransmitted; and any distortion of data is removed. Removal of compounding signal distortion in turn removes the restriction on the number of stations permitted to be connected on the data bus.

If a customized gate array implementation of clock processor 46 is used, the clock is generated in four to eight nanoseconds after the beginning of a received data block. If a discrete component realization is used, this period of time is increased to approximately fifteen to twenty five nanoseconds.

The data and the synchronized clock outputs of clock processor 46 are applied as inputs to serial to parallel data converter 48, which utilizes a shift register circuit to convert the serial data from generator 42 into parallel bit data. This parallel bit data is supplied as an input to a parity generator 52 which provides a parity bit output, the logic level of which is dependent upon the parity of the parallel bit data output of the serial to parallel data converter 48.

A serial data output of the serial to parallel converter 48 and the synchronized clock from clock processor 46 are provided to frame check sequence generator tester 44. The data on the data bus has a frame check sequence using a cyclic redundancy code added at the end of each transmitted message to permit a check of the accuracy of the data received. The polynomial used for the cyclic redundancy code is given by the function:

$$X^{16}+X^{12}+X^5+1.$$

Frame check sequence generator tester 44 provides, with a degree of certainty dependent on the selected polynomial, a logic output indicating whether the data received from generator 42 is correct or contains an error. This logic output, the parallel bit data from converter 48, the parity output of parity generator 52 and the optimum phase or synchronized clock output of clock processor 46 are provided to an ECL to TTL translator 54 which puts the parallel bit data and parity data on bus 26.

Having described the operation of receiver section 22, the operation of transmitter section 24 is now described.

Parallel bit data plus parity and control signals from I/O interface 30 are provided to a TTL to ECL translator 56. A main unit of the BIU transmitter section 24 is the timing control 58, which derives the basic timing signals for the circuits of transmitter section 24 from crystal oscillator 50.

The timing control packs for the transmitter and before sending it out to the data bus, and to I/O interface 30, respectively. The inserted or eliminated bits are:

(1) A synchronization bit, value 1, at the beginning of every message;

(2) A bit between every sixteen bit word of the message. This bit is always the complement of the previous bit of the message.

(3) A terminating bit inserted at the end of the message which is always identical to the last bit of the FCS word.

The insertion of the these bits permits bus interface unit 20 to define a crystal clock phase, synchronized with the leading edge of the message; the data envelope which starts with the synchronization bit and terminates sixteen bits after the terminating bit, and a rejection of noise criteria, because it limits the communication bandwidth between a frequency equal to the data rate and a frequency equal to one seventeenth of the data rate.

The parallel bit output of TTL to ECL translator 56 is supplied to a parallel to serial data converter 60 which operates in synchronization with the timing signal from timing control 58. Parallel to serial data converter 60 includes shift registers which provide, at the most significant bit, serial data to an output data selector 62.

Parallel bit data, plus its parity bit provided by parallel to serial data converter 60, is also supplied to a parity tester 64. Parity tester 64 also receives timing signals from timing control 58.

A logic signal representative of the parity of the parallel bit data from parallel to serial data converter 60 is supplied by parity tester 64 to TTL to ECL translator 56 to provide an indication of whether the parity of the converted data is correct or incorrect.

This logic signal is also supplied to a frame check sequence generator 66. Generator 66, using the transmitted serial data and timing signals from timing control 58, produces a frame check sequence or cyclic redundancy code which is supplied to output data selector 62 and appended to the end of data transmitted on to the data bus by main subring optical driver 36. The polynomial mentioned above is the basis for the code.

If the logic signal representative of parity from parity tester 64 indicates incorrect parity, then frame check sequence generator 66 alters the appended cyclic redundancy code to produce a deviation therein. Thus, when the message transmitted by bus interface unit 20 on the data bus reaches the destination ports, it is recognized by the FCS generator tester of the receiver section of the BIUs of these ports as being inaccurate data, in which case it is not provided to the respective host computer interface. This is a major advantage in that the end of the message indicates there is an error immediately and the BIUs of subsequent ports do not pass the erroneous data on to their respective host computer or I/O interfaces.

In addition to the output from frame check sequence generator 66 and the serial data from parallel to serial data converter 60, output data selector 62 also receives as data inputs the serial data and data envelope from subring switch and data envelope generator 42. However, the data from generator 42 is delayed by a six bit digital delay 68, which provides a window during which an observation may be made as to whether new data is arriving, so that a message originating in I/O interface 30, will not be transmitted over another port's message. Output data selector 62 receives as control inputs timing signals from timing control 58 and the optimum phase clock signal from clock processor 46. Thus, output data selector 62 always places the data passing through the port back on the bus unless the data is from a message of this port returning from its trip around the bus.

Figure 2:
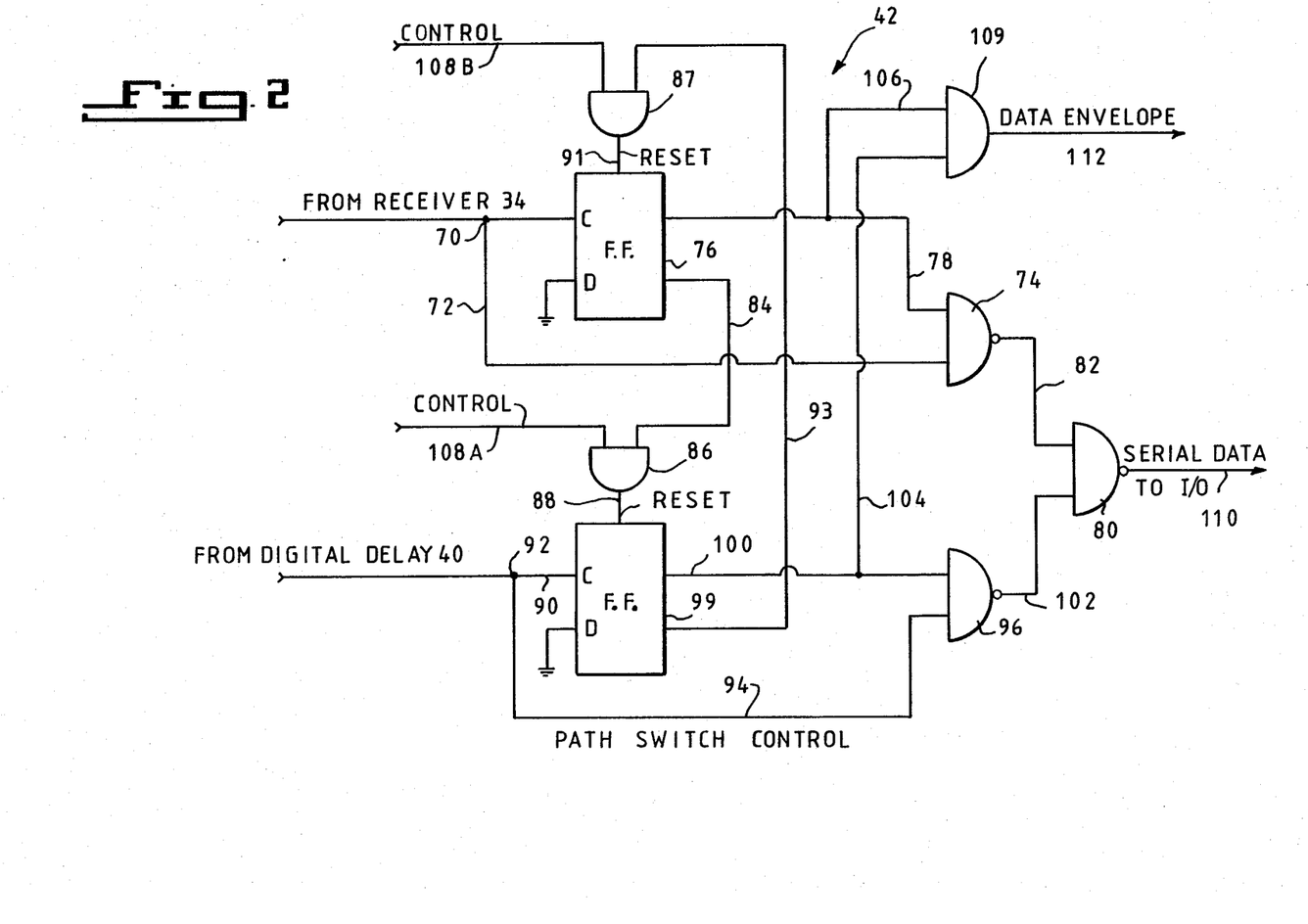
FIG. 2 is a logic diagram of a realization of the subring switch and data envelope generator of FIG. 1.

FIG. 2 illustrates a logic diagram of the subring switch and data envelope generator previously indicated by reference numeral 42 in FIG. 1. Data present at the output of receiver 34 is split at junction point 70. A first circuit path includes wire 72 connected to the lower terminal of gate 74. The second connection from junction point 70 is to the clock input of flip-flop 76 which, when set, furnishes gate 74 with a control signal along line 78 connected to the upper terminal of the gate permitting, for each bit of data present at point 70, a corresponding bit to be transmitted along path 82 for introduction to the upper input terminal of gate 80. The output from digital delay 40 (from receiver 32) undergoes, at succeeding points, a similar logic operation as just discussed in connection with the data from receiver 34. Data from digital delay 40 is split at junction point 92 and is fed along wire 98 to the clock input of flip-flop 99 and simultaneously along wire 94 to the lower input terminal of gate 96. Upon setting flip-flop 99 a control signal becomes present along wire 100 which is connected to the upper input terminal of gate 96 permitting, for each bit of data present at point 92, a corresponding bit to be transmitted along path 102 to the lower input of gate 80.

During usual operation of the subring switch and data envelope generator 42 of FIG. 2, if the data from receiver 34 is arriving first, this causes flip-flop 76 to set. A signal along wire 84 is transmitted to gate 86 connected in series with the reset terminal of flip-flop 99 to inhibit the response by flip-flop 99 to a subsequently received identical data signal from receiver 32 by way of digital delay 40. In the event data from receiver 32 is received by subring switch and data envelope generator 42 first, it is responded to by flip-flop 99, and a set signal will appear along wire 93 for connection to gate 87 and series connected reset terminal 91 of flip-flop 76, to inhibit response by flip-flop 76 to any subsequently received identical data from receiver 34. After a communication cycle has terminated control lines 108A and 108B from I/O interface 30 (not shown in FIG. 1) are energized; and via respective gates 86 and 87, they reset flip-flops 99 and 76 thereby terminating their operation until a new communication cycle with the involved port occurs. The serial data processed by the subring switch and data envelope generator 42 will appear on line 110, at the output of gate 80. A data envelope gate 109 having input wires 104 and 106 respectively connected to the outputs of flip-flops 99 and 76, generates a data envelope on wire 112 during the interval of serial data generation. The serial data and the data envelope signal are necessary for proper communication with a typical I/O interface 30.

Figure 3:
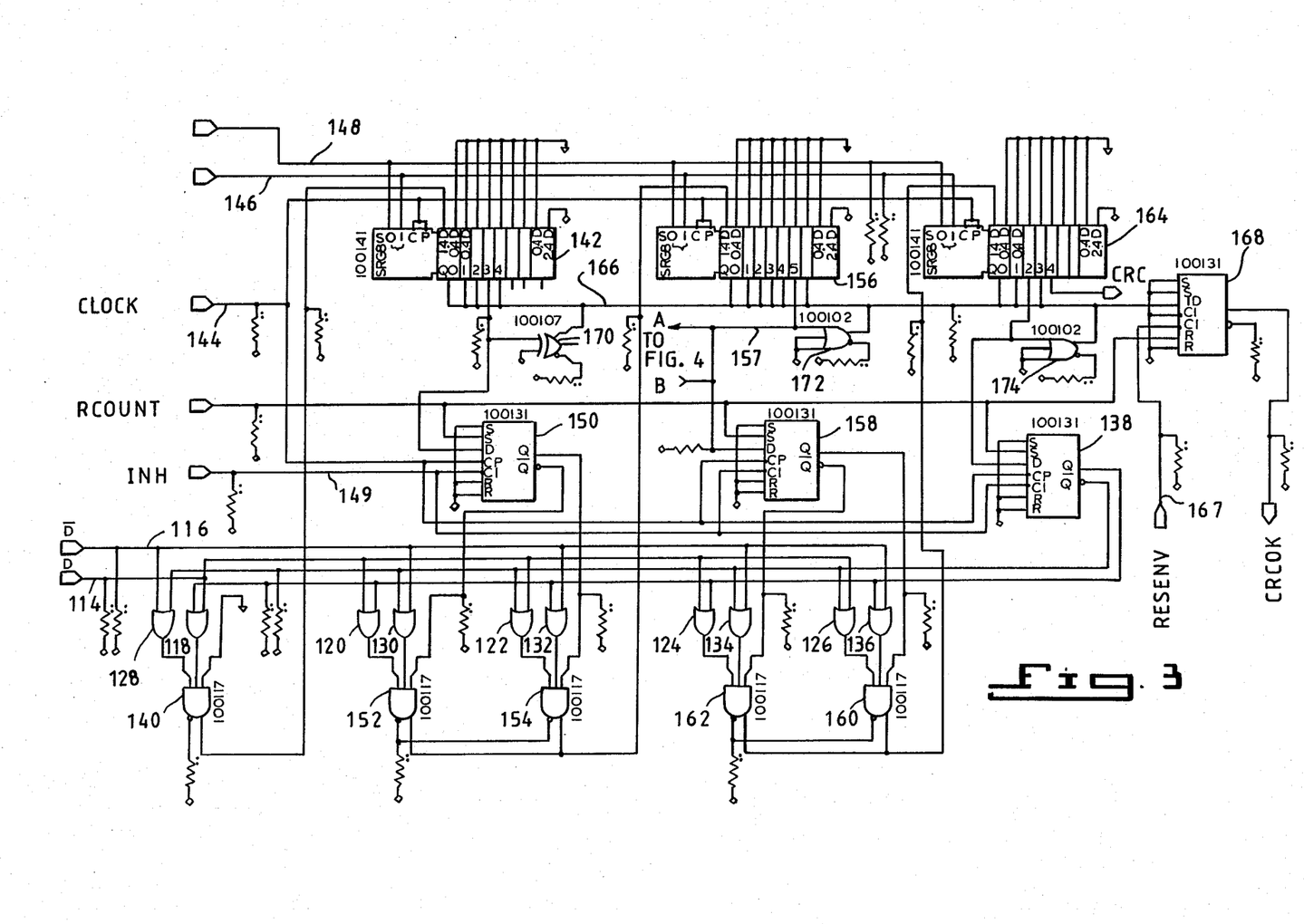
FIG. 3 is a logic diagram of a circuit used for implementing at extremely high speed the FCS generator tester and the FCS generator of FIG. 1.

FIG. 3 is a logic diagram of frame check sequence generator tester 44 which embodies a unique approach to speed-up the operation. The operation is described for an ECL logic realization. Resistors shown are used only for ECL. A TTL realization is also possible.

Before the operation the generator 42 is preset to all logic "1"s by control lines 146 and 148. The control lines 146 and 148 permit or inhibit a parallel loading or shift operation. Serial data from serial to parallel converter 48 and its logical complement, are applied to lines 114 and 116 respectively. The data on line 114 is distributed to a first input of OR gates 118, 120, 122, 124 and 126. The logic complement of the data, on line 116, is distributed to one input of OR gates 128, 130, 132, 134 and 136. The second inputs of each of OR gates 118, 120, 132, 124 and 136 is controlled by the Q output of a flip-flop 138. The second input of each of OR gates 128, 130, 122, 134 and 126 is controlled by the $\bar{Q}$ output of flip-flop 138.

The outputs of OR gates 128 and 118 are each connected to an input of an AND gate 140. The third input of AND gate 140 is connected to circuit ground (ECL logic one). Since either one of OR gates 128 and 118 will always have an output at logic one (depending on the state of flip-flop 138), the output of AND gate 140 will assume the same logic state as either the data on line 114 or its complement on line 116, depending on the state of flip-flop 138.

Figure 5A:
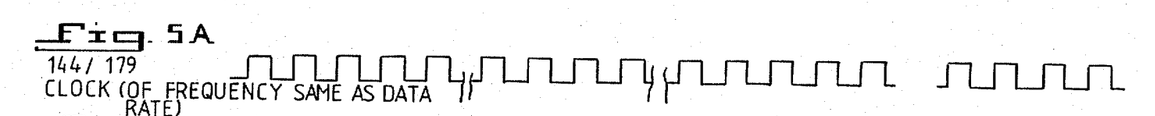
FIGS. 5A to 5I are logic timing diagrams of several of the logic control signals of FIG. 3 and FIG. 4.

The output of AND gate 140 is applied to the data or $D\emptyset$ input of a five bit shift register 142. Shift register 142 is preferably an ECL F100141, configured for five bit operation and is clocked by clock pulses present on clock line 144 (FIG. 5A). The $P\emptyset$ to P7 preload inputs of shift register 142 are all connected to circuit ground (logic one). When control line 146 (and therefore control input $S\emptyset$ of shift register 142) is at logic zero, shift register 142 is preloaded. When control lines 146 and 148 are at appropriate logic levels, then shift register 142, and the other shift registers of FIG. 3 described below, are freed to shift data at their respective inputs $D\emptyset$ in response to the clock signal (FIG. 5A) on line 144.

The Q3 output (next to last bit) of shift register 142 is connected to the D input of flip-flop 150 which is also clocked by the clock signal on line 144. Thus, the Q output of flip-flop 150 is identical to the Q4 output of shift register 142, but its complement is available at the $\bar{Q}$ output of flip-flop 150. Flip-flop 150 is also preset to "1" by a logic signal RCOUNT, when all shift registers are preset to logic one before the operation starts.

The $\bar{Q}$ output of flip-flop 150 is provided as an input to an AND gate 152. The outputs of OR gates 120 and 130 are each provided as one input to AND gate 152. The Q output of flip-flop 150 is provided as an input to AND gate 154. The outputs of OR gates 122 and 132 are each provided as one input to AND gate 154.

The outputs of AND gates 152 and 154 are connected in parallel to the data input of a shift register 156. Shift register 156 is identical in type, and control configuration to shift register 142 and such details will not be repeated. However, shift register 156 is configured as a seven bit shift register.

A flip-flop 158 serves a function identical to flip-flop 150 for the next to last bit (the sixth bit) of shift register 156. The Q output of flip-flop 158, logically identical to the seventh bit of shift register 156 is applied to an input of AND gate 160. The output of OR gate 126 is applied to another input of AND gate 160, while the output of OR gate 136 is supplied to a third input of AND gate 160.

The $\bar{Q}$ output of flip-flop 158 is applied to an input of AND gate 162. The output of OR gate 124 is applied to another input of AND gate 162. The output of OR gate 134 is applied to the third input of AND gate 162.

The outputs of AND gates 160 and 162 are connected in parallel and applied to data input D0 of a shift register 164. Shift register 164 is identical in type operation and circuit connection to shift registers 142 and 156, but is configured as a 4 bit shift register.

The third bit (the next to last bit) of shift register 164 is supplied to the data input of flip-flop 138. Flip-flop 138 is clocked by the clock signal on line 144.

The bit outputs of shift registers 142, 156 and 164 (with the exception of the next to last bit of each) are all connected to a line 166 and applied to the data input of a flip-flop 168. The next to last bit of flip-flop 142 is connected to the input of an EXCLUSIVE OR gate 170, the output of which is connected to line 166. The next to last bit of shift register 156 is applied to line 166 by way of OR gate 172, while the next to last bit of shift register 164 is applied through OR gate 174.

When the circuit of FIG. 3 is operating as an FCS generator tester, if the cyclic redundancy code is correct, then all the bit outputs of shift registers 142, 156 and 172 are equal to zero and when flip-flop 168 is clocked at its CP input, the Q output thereof is zero, indicating the code is correct. However, if the code is wrong, then at least one of the bit outputs of the shift registers will be at logic one, and the Q output will be at logic one, indicating an error.

Figure 5B:
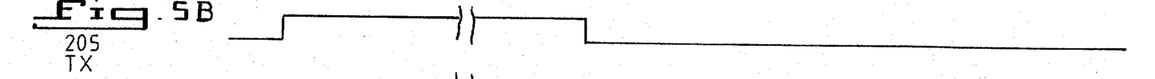
Figure 5C:
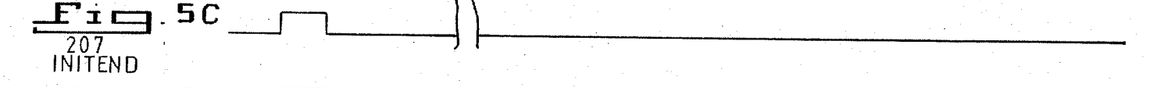
Figure 5D:
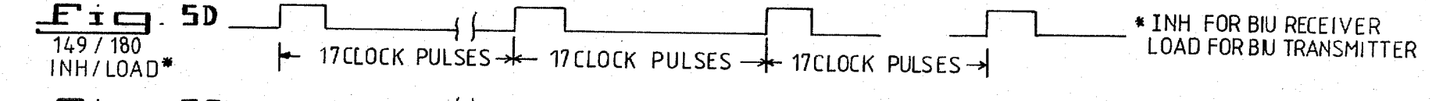
Figure 5E:
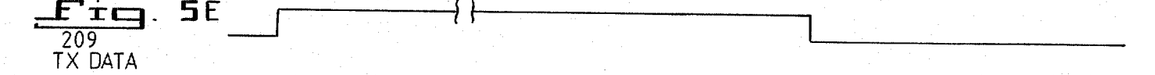
Figure 5F:
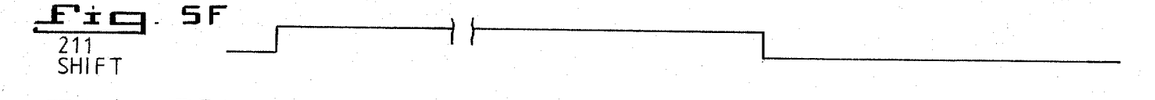

At the end of every message a signal RESENV 167 (FIG. 5I) stores in flip-flop 168 the ORed value of the 16 outputs of the FCS generator tester, which is the result of the test. A logic value of zero indicates that an error-free reception has been completed. An inhibit signal INH on a line 149 (FIG. 5D) prevents operation of the three flip-flops 138, 150 and 158 and a proper combination of control signals 146 and 148 after the sixteen bits inhibit the FCS generator from including the added bits as part of the data.

For use of the FCS generator in the transmitter, OR gates 170, 172 and 174 and flip-flop 168 need not be present. The cyclic redundancy code for the data applied to line 114 is available at the last bit output of shift register 164 when all data have entered the FCS generator. The FCS word is then shifted out to the OR gate 210 (FIG. 4) after disabling the feed-back loops by keeping both flip-flops 138 and 188 reset.

To produce an incorrect frame check sequence in the transmitter in response to a parity error, as determined by parity tester 64, line 157 to the D input of flip-flop 158 is broken at point "X" and an EXCLUSIVE OR gate 183 associated with parity tester 64 (FIG. 4) completes the connection. Thus, as more fully described below, if the parity is incorrect, the frame check sequence is disturbed.

A major advantage of the special FCS generator/-generator tester circuit of FIG. 3 is the parallel processing of the feedback data from the last flip-flop of the FCS generator. The high speed is achieved by using a single chip construction for each set of OR gates (for example, OR gates 118 and 128) and their associated AND gate (for example, AND gate 140) so as to minimize propagation delays to approach the maximum bandwidth of the logic circuitry.

Figure 4A:
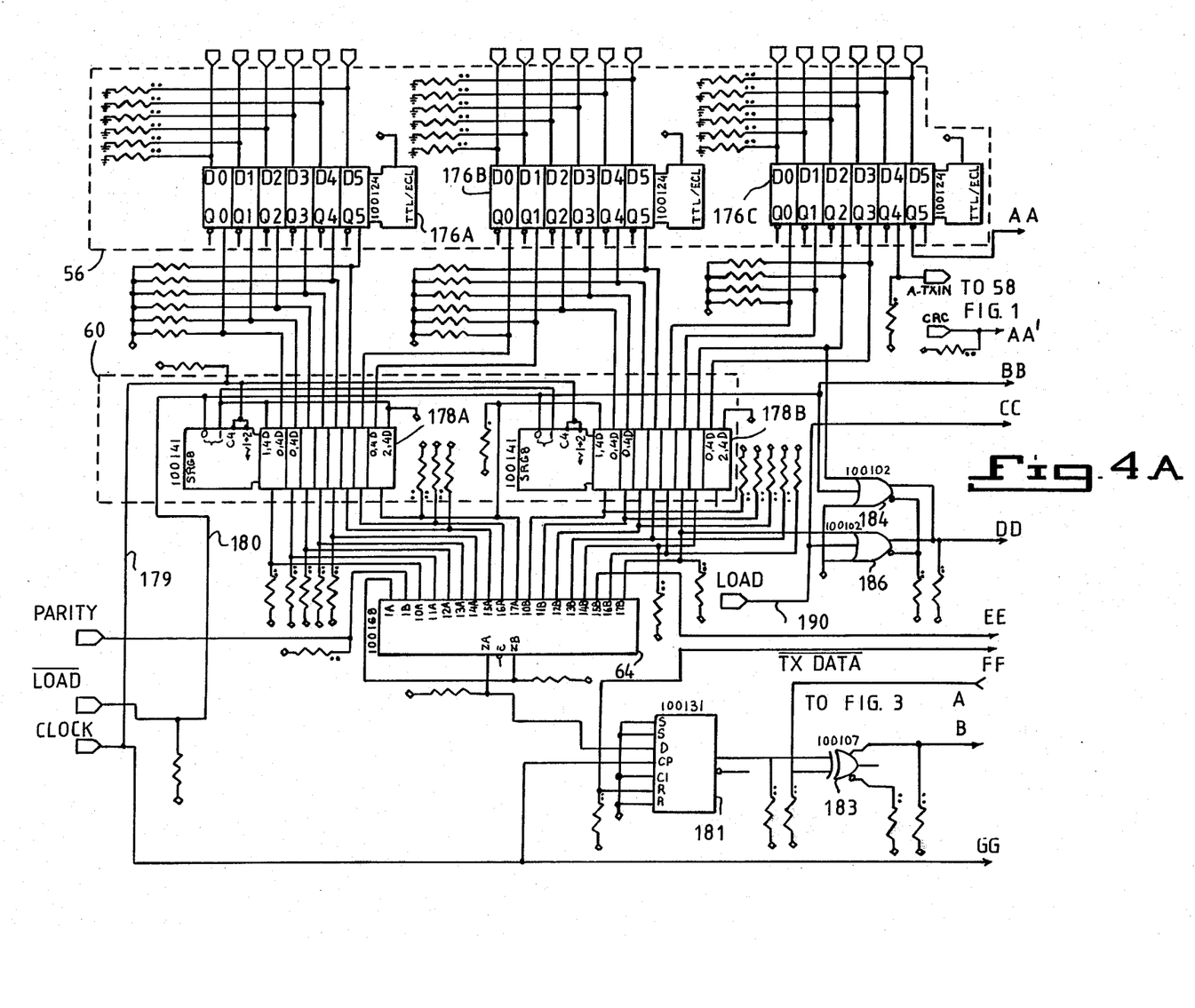
Figure 4B:
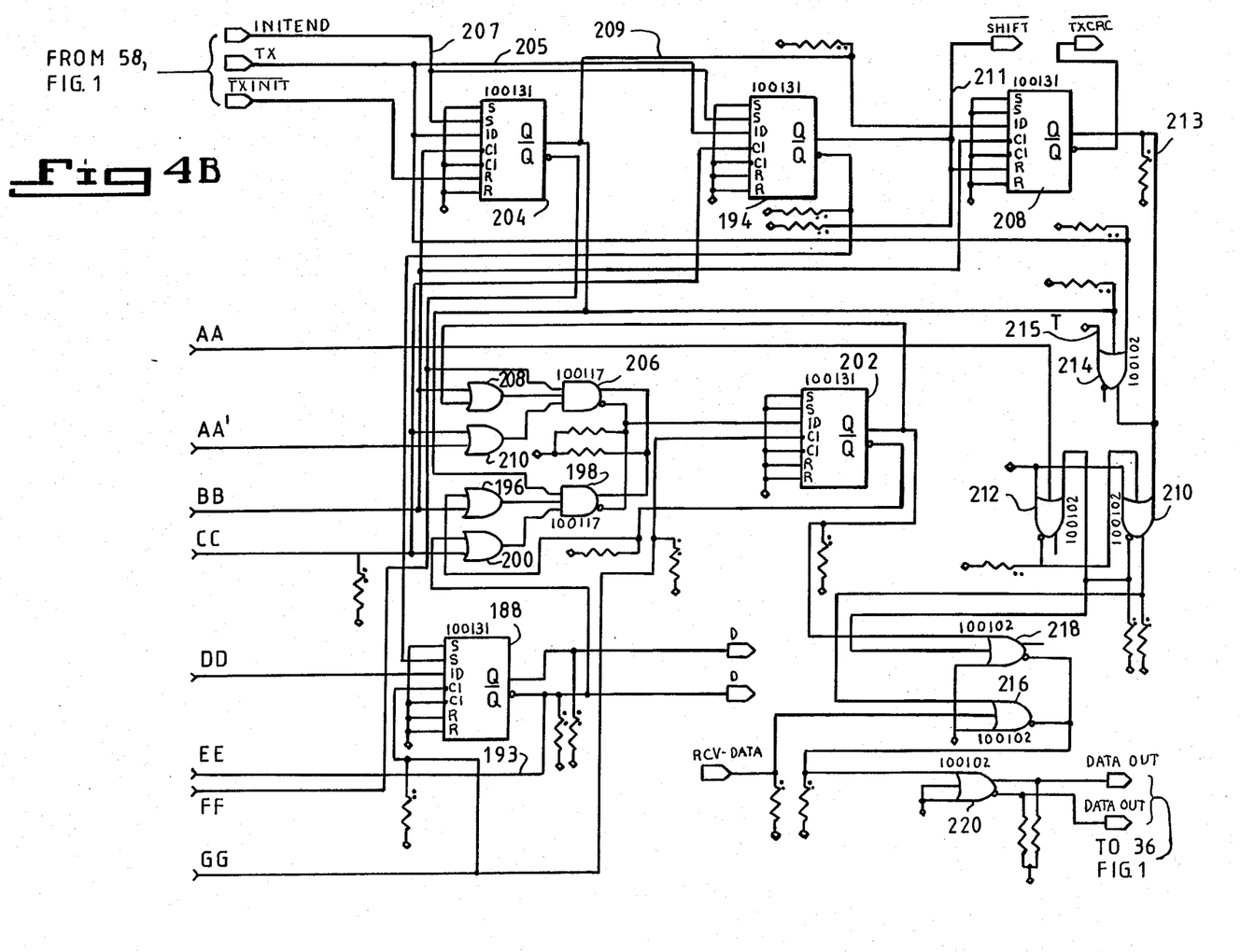

Referring to FIG. 4, 16 bits of parallel data and two control signals from I/O interface 30, are applied to the data inputs of three TTL to ECL translator chips 176A, 176B and 176C which make up TTL to ECL translator 56 and which are preferably of ECL type F100124. The control signals, present at the D4 and D5 inputs of chip 176C are transmit data envelope ($\overline{TXIN}$) and stop transmit ($\overline{STOPT}$) signals.

The sixteen bits of parallel data from chips 176A, 176B and 176C are applied to the preload inputs of two shift registers 178A and 178B which together make up parallel to serial data converter 60 (FIG. 1). Shift registers 178A and 178B may be ECL type F100141, with the former being connected for eight bit operation and the latter connected for seven bit operation. The Q7 (most significant bit) of shift register 178A is connected to the D0 data input of shift register 178B. The serial inputs of shift register 178B and serial inputs of shift register 178A are connected to ECL logic zero. Shift registers 178A and 178B are parallel loaded with the data from translators 176A, 176B and 176C when line 180 carrying signal $\overline{LOAD}$ (FIG. 5D), connected to the S0 control inputs of shift registers 178A and 178B, drops from ECL logic one to logic zero and shift when the line is at level "1". The S1 control input of shift registers 178A and 178B are maintained at ECL logic zero. Shift register 178A and 178B are clocked by signals applied to the CP inputs by line 179 (FIG. 5A).

The Q0 to Q7 outputs of shift register 178A, the Q0 to Q6 outputs of shift register 178B and the Q output of flip-flop 188 are applied to the inputs of single chip parity tester 64 (FIG. 1), which may be an ECL type F100160K. The parity check output of parity tester 64 is applied to the D input of a flip-flop 181, which is initialized by a signal $\overline{TXDATA}$ and clocked at its C input once for every data word. Flip-flop 181 thus stores the parity check information until a new word is received, and its parity checked. The Q output of flip-flop 181 is applied to one input of EXCLUSIVE OR gate 183. The output of EXCLUSIVE OR gate 183 is connected to point B of the circuit illustrated in FIG. 3 (when it is configured as an FCS generator 66 for the BIU transmitter). In this case the other input of EXCLUSIVE OR gate 183 is connected to point A to receive the Q5 output of shift register 156. If the parity is tested wrong, the output of flip-flop 181 goes to logic one, which inverts the logic level present at the other input of EXCLUSIVE OR gate 183, and thus alters the FCS word to an incorrect value.

The remaining circuitry of FIG. 4 consists of output data selector 62 and associated control logic. The Q3 output of translator 176C is applied to one input of a NOR gate 184. The other input of NOR gate 184 is connected to line 180 carrying signal $\overline{LOAD}$, which is a signal going to logic zero level every seventeen bits and remains at logic zero for a duration of one bit.

The output of NOR gate 184 is connected in parallel with the output of NOR gate 186 and to the D input of a flip-flop 188 which represents the most significant bit of shift register 178B. A first input of NOR gate 186 is connected to a line 190 which has a signal thereon equal to the logical complement of the signal on line 180. The second input of NOR gate 186 is connected to the Q6 output of shift register 178B. Input CP of flip-flop 188 is clocked by the basic clock provided by timing control 58. The R input of flip-flop 188 is permanently deactivated while the S input is controlled by the $\overline{Q}$ output of a flip-flop 194 and remains set during the FCS word transmission. The result of this arrangement is that data from I/O interface 30 appears at the $\overline{Q}$ output of flip-flop 188, while the logic complement of the data appears at the Q output. The $\overline{Q}$ output of flip-flop 188 is connected to the I6B input of parity tester 64 as the bit 16 input.

The serial data "D" from the $\overline{Q}$ output of flip-flop 188 is applied to a first input of an OR gate 196. The second input is controlled by the logic signal on line 190 which is a pulse having a width of one bit repeated every seventeen bits. The output of OR gate 196 is connected to an input of AND gate 198 which operates during the transmission of the serial data. Another input of AND gate 198 is connected to the output of an OR gate 200. A first input of OR gate 200 is controlled by the logic signal on line 180 which is the complement of the signal on line 190. The second input of OR gate 200 is connected to the Q output of a flip-flop 202 to provide a bit which is the complement of the previous data bit every sixteen bits of data. The third input of AND gate 198 is connected to the Q output (TXDATA on line 209, FIG. 5E) of a flip-flop 204 which, when active, indicates data transmission. The output of AND gate 198 is connected in parallel with the output of an AND gate 206 and to the D input of flip-flop 202.

Figure 5G:
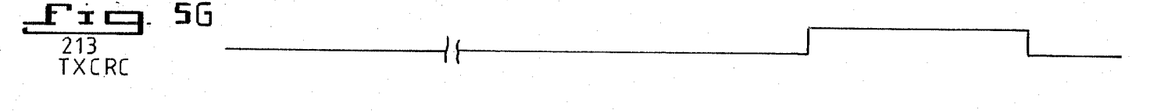

A first input of AND gate 206 is connected to the output of an OR gate 208, TXCRC, on line 213 (FIG. 5G). A first input of OR gate 208 is connected to the Q output of flip-flop 202 to provide a bit identical to the previous data bit. The other input of OR gate 208 is controlled by the logic signal on line 180.

The second input of AND gate 206 is connected to the output of OR gate 210. A first input of OR gate 210 is controlled by the logic signal on line 190. The second input of OR gate 210 receives the serial data of the cyclic redundancy code generated by the FCS generator 66 (FIG. 1).

The third input of AND gate 206 is connected to the $\overline{Q}$ output of flip-flop 204 which, when active, indicates FCS word transmission. The D inputs of flip-flops 204 and 194 receive a control signal TX (FIG. 5B) from the protocol hardware. The S inputs of flip-flop 204 and 196 are both connected to a control signal INITEND on line 207 (FIG. 5C) which is a logic one pulse generated at the beginning of each transmission to initialize these flip-flops. The R input of flip-flop 204 is connected to a control signal TXINIT which is another pulse generated a short time ahead of the INITEND pulse. Flip-flop 204 is clocked at its CP input by the logic signal on line 180, while flip-flop 194 is similarly clocked by the logic signal on line 190. The R input of flip-flop 194 is connected to ECL logic zero.

The Q output of flip-flop 204 is connected to the data input of a flip-flop 208. The R input of flip-flop 208 is connected to the Q output of flip-flop 194, $\overline{SHIFT}$ (FIG. 5F), on line 211. Flip-flop 208 is clocked at input CP by the logic signal on line 180.

The Q output of flip-flop 208 is applied to a first input of one of two cross coupled NOR gates 210 and 212 which together form an RS flip-flop. The output of an OR gate 214 is also connected to the first input of NOR gate 210. A first input of OR gate 214 is connected to the signal TX that is also applied to the D inputs of flip-flops 204 and 194. The second input of OR gate 214 is connected to the Q output of flip-flop 204.

Figure 5H:
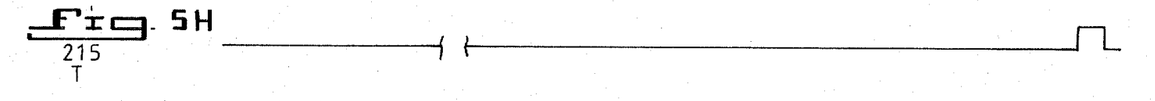
Figure 5I:
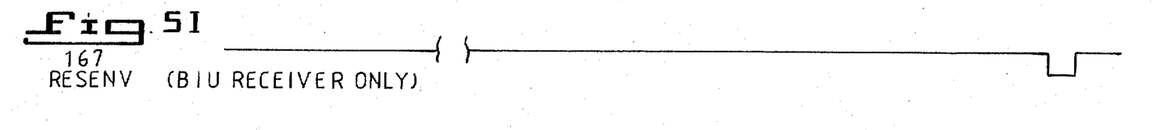

The RS flip-flop of NOR gates 210 and 212 is thus set by the output of OR gate 214, which is active when the signal TX is active (indicating transmission is to commence) or when TXDATA is active (indicating transmission of locally generated data from I/O interface 30) or when the Q output of flip-flop 208 is active, indicating transmission of the FCS word associated with the locally generated data, in this order. Any of these signals thus cause a transmit enable signal TXEN, from the inverting output of NOR gate 210 to be applied to a first input of a NOR gate 218. This signal is removed when a reset signal T on line 215 (FIG. 5H) is applied to a second input of NOR gate 212 indicating that data circulated on bus 39 can now be passed back on to bus 39. This reset signal is a timing pulse coming from I/O interface 30 generated immediately after the transmission of data.

Received data from subring switch and data envelope generator 42 is applied to the second input of NOR gate 216. The output of NOR gate 216 is connected in parallel with the output of a NOR gate 218. A first input of NOR gate 218 is connected to the inverting output of NOR gate 210 which is activated when the TX signal on line 205 becomes active indicating that data transmission to bus 39 is blocked. The second input of NOR gate 218 is connected to the Q output of flip-flop 202 the output of which is the data converted from parallel to serial form.

The outputs of NOR gates 216 and 218 are connected to a first input of a NOR gate 220. The second input of NOR gate 220 is connected to a signal STOPTX which prevents a message received after travelling around the ring from being retransmitted a second time on bus 39. NOR gate 220 acts as a power driver for main subring optical driver 36 (FIG. 1) or wire connection if it is used instead of an optical medium.

The arrangement of NOR gates 216 and 218 permits the transmission of circulating data, i.e., data received from a previous station (TXEN is at logic zero), or data originating in I/O interface 30 (the inverting output of NOR gate 210 is at logic zero).

Flip-flops 188, 194, 202, 204 and 208 are all preferably of ECL type F100131.

FIGS. 5A to 5I illustrate the timing relationships between several of the logic control signals of FIG. 3 and FIG. 4. For each signal illustrated, the line or wire on which signal appears as well as any signal name referred to herein, is provided.

Timing control 58 (FIG. 1) is basically a divide down counter which frequency divides the signal from oscillator 50 to generate signals divided by two, four, eight and seventeen as well as the signals or lines 180 and 190.

The bus interface unit 20 and the I/O interface 30 together define a port of data bus 39. The I/O interface 30 of FIG. 1 may take many forms but is preferably configured to have a user interface unit and a medium access controller (protocol) as described in N. G. Avaneas, "A 100 Megabits Per Second Advanced Data Bus System," *Proceedings of the IEEE National Aerospace and Electronics Conference-NAECON*, Dayton, Ohio, May 19-23, 1986.

The user interface unit typically includes a data buffer memory and a user interface control (microcomputer). The data buffer memory is formed of two identical subunits. Each subunit is a dual port memory servicing one direction of data flow with a maximum throughput rate equal to the rate of data on the bus. The size of the memory of each subunit is 17 bits×65 kilowords. Each word consists of 16 bits of data and a parity bit, generated and checked as described above.

In addition to the memory, each subunit contains an intelligent control, which generates the signals necessary for interface handshaking, memory space availability, data presence, etc. The control of each subunit permits simultaneous read and write operation with the same or different data rates up to a maximum of as many words/second/direction as is necessary for the total number of bits to be the same as the data rate on the bus. In a full duplex mode of operation the data buffer memory can maintain a throughput rate in words equal to twice the data rate divided by seventeen.

The user interface control is a microcomputer capable of handling any one of three different interfaces with the user while maintaining communication with both a fast microcomputer contained in the medium access controller (described below) and with the data buffer memory. The user interface control is advantageously designed to support an asynchronous serial, a synchronous serial and a parallel type interface. In addition to the interfaces it includes a microprocessor and a data transfer control. The user interface control is also responsible for testing the data buffer memory and reporting the results to the medium access controller and to the user, if the latter is connected through a high intelligence interface.

The medium access controller is the realization of the Data Link Layer of what is known as the Open System Interconnection reference model. It operates on 16-bit data words received and transmitted at a repetition rate of the data rate divided by seventeen from and to the physical and network layers. The medium access controller includes a hard-wired protocol a very fast microcomputer, and operation timers.

Since the data rate is very high, a microcomputer, no matter how fast its operation, cannot perform the instantaneous decisions of the protocol at this data rate. Therefore, the protocol is mainly hard-wired. On the other hand, some parameters of the protocol may be softwired, and may also be reprogrammable from another port.

The fast microcomputer of the MAC is used for making higher level protocol decisions, managing the port's housekeeping, and performing and reporting the tests and status of the port and bus.

Figure 6:
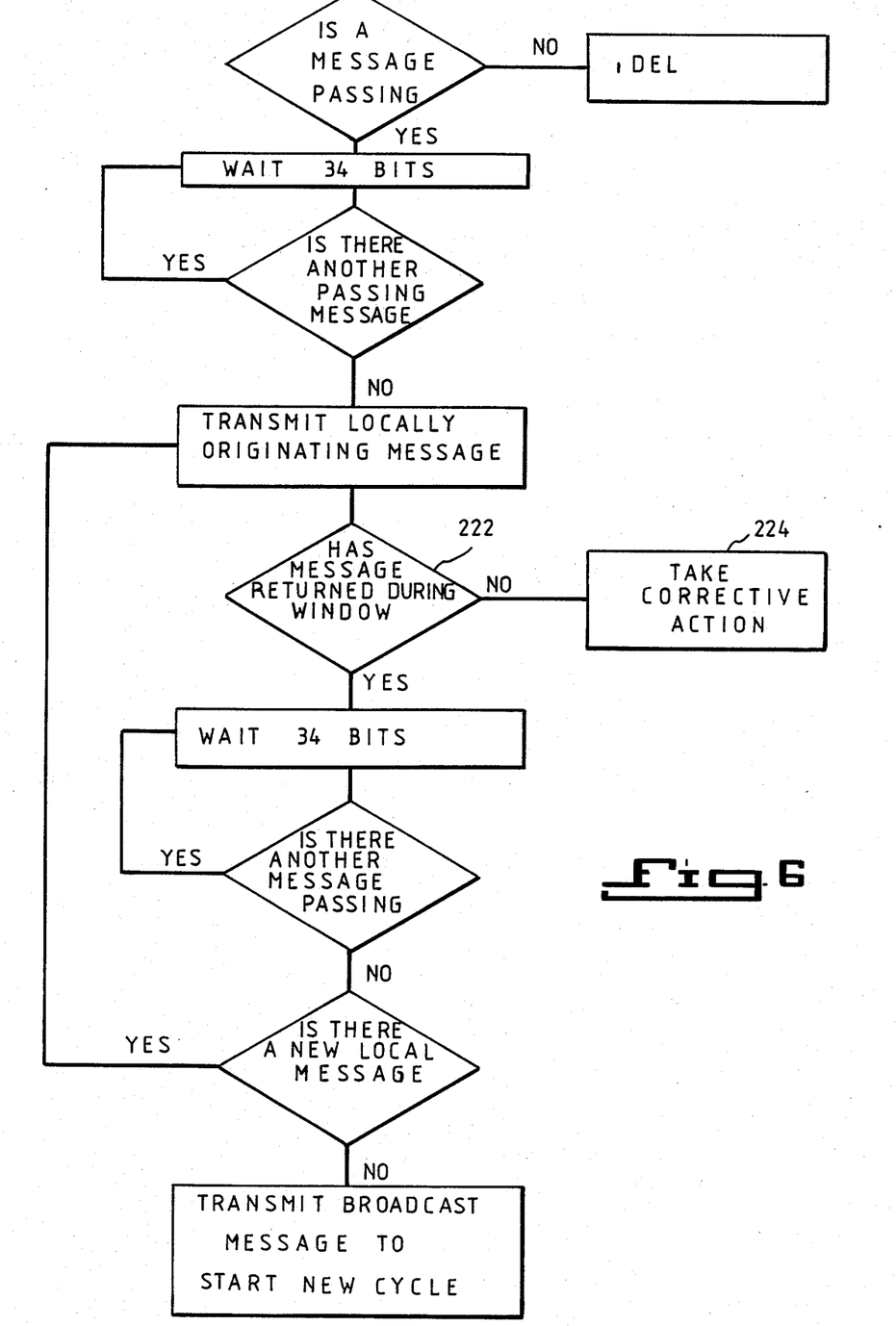
FIG. 6 is a general flow diagram of the protocol used by the system of which the bus interface unit is a part.

While many protocols can be used, a logic diagram of the preferred protocol is shown in FIG. 6. This protocol is a synchronous variable message train protocol which is required to combine the two subring configurations into a single data bus system. In addition, more rigorous requirements than those required by a Local Area Network (LAN) should preferably be imposed on the protocol. This guarantees that the system can easily realize a LAN, a distributed-processing or a real time system where the response time is more important than the capability of transmitting continuously a vast amount of data.

The protocol is preferably designed to accommodate very high data rates, fast system response, fault-tolerant operation, high efficiency, a very large number of ports, transparent and universal user interface and fully distributed interport operation with remote soft-wiring capability.

Table 1 shows the major specifications of the protocol, which is discussed in more detail below.

Table 1

PROTOCOL SPECIFICATIONS–100 MHz DATA RATE AND HIGHER

1. BUS TOPOLOGY: Hybrid High Speed Data Bus (HHSDB)
2. PROTOCOL: Variable message train with equally weighted ports
3. MAX NUMBER OF RINGS PER SYSTEM: 3
4. DATA RATE: 100 Megabits/second or higher
5. MAX NUMBER OF PORTS PER RING: 4096
6. RESPONSE TIME: Generally under 500 microseconds (up to 256 ports per ring).
8. EFFICIENCY UNDER MAX. DATA LOAD: Better than 93%
8. METHOD OF DATA TRANSMISSION: NRZ-data with a bit insertion/elimination every 16-bits of message
9. MAX. NUMBER OF DATA BLOCKS PER MESSAGE-TRAIN PER PORT: 1
10. MAX NUMBER OF DATA BITS PER DATA BLOCK: 8192
11. MAX. RING LENGTH: 100 Kilometers
12. MAX. RING LENGTH: 400 meters
13. MAX. LINK LENGTH FROM SIGNAL-SPLITTER TO PORT: 50 meters
14. ADDRESSING METHODS (USER/INTERPORT):
    a. Single destination with handshaking
    b. Multiple destination with handshaking
    c. Broadcast
15. USER INTERFACE: Universal and transparent
16. PROTOCOL PARAMETERS: Locally, or remotely soft-wired The protocol permits interport messages which are of the broadcast type or are of single destination with handshaking. It also permits user data messages which are of broadcast type, single destination with handshaking, and multicasting with handshaking.

Figure 7:
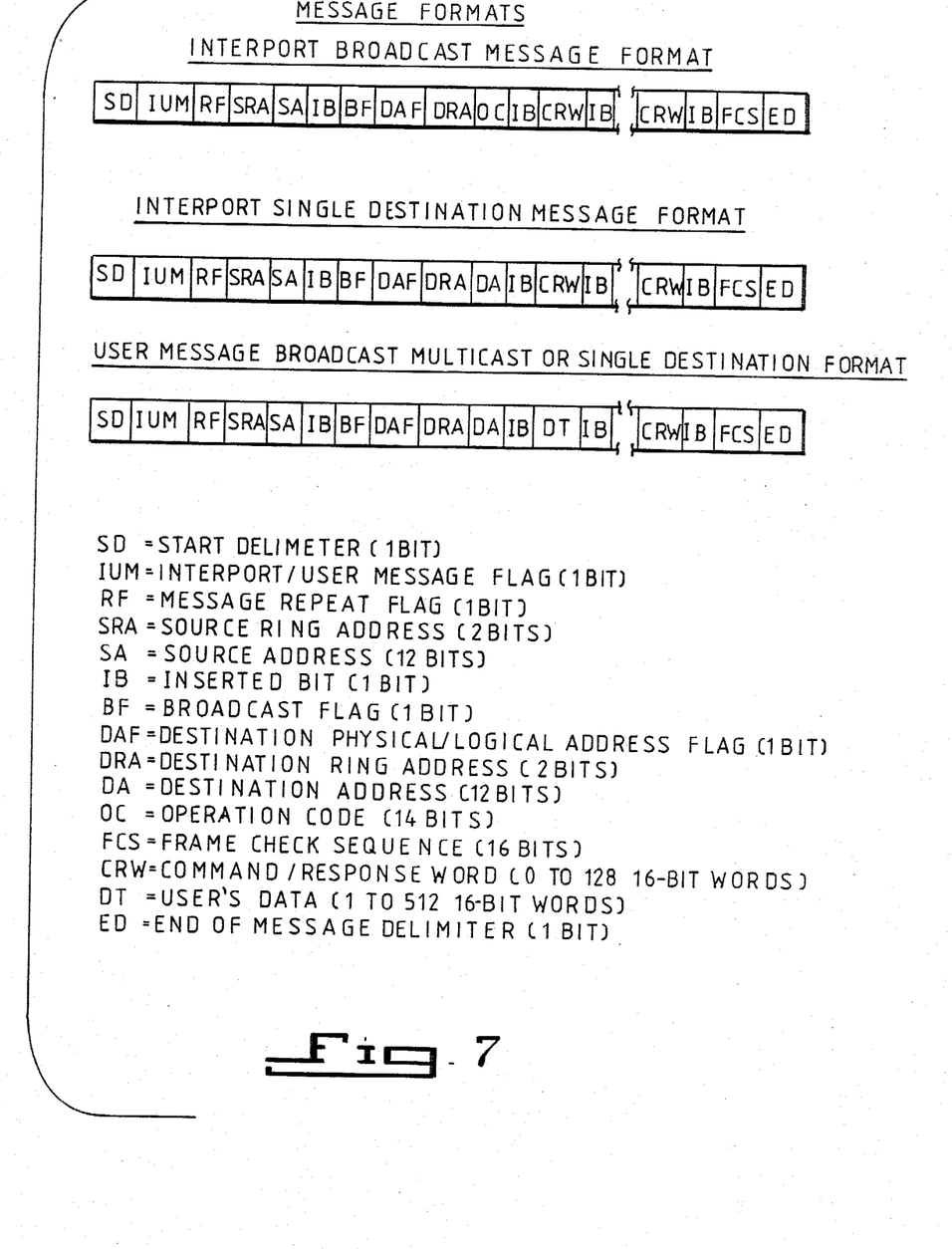
FIG. 7 is a table of message formats transmitted under the protocol of FIG. 6.

FIG. 7 illustrates the formats of the permissible messages.

A message consists of a multiple of 16-bit data words which may total from 1 to 512 (0 to 8192 data bits) plus 2 overhead words. However, as noted above, an extra bit for every 16-bit word is transmitted. This additional bit is not used for synchronization purposes, but to transform a DC method of transmission into an AC method. The extra bit also assists the bus interface unit in the definition of the message envelope without any additional overhead. This bit also accounts for most of the 7% efficiency loss (Table 1, item 7) with respect to a 100% efficient system.

A message transmitted onto the medium is transferred from port to port around the ring and back to the originator. It is the responsibility of the originator to remove it from its own subring, and the responsibility of the port next in sequence to remove it from the other subring.

Each port transmitting a message opens transmission on its subring and closes it when it has received the message from its trip around the ring. An adaptive time window (FIG. 6, step 222) defined by:

170 nsec to L+340 nsec, where

L=Ring's latency is established during an initialization or reinitialization operation. A port monitors the ring for the return of its message only during this window, ignoring the prior transmissions (noise). Furthermore, if it does not receive its message during this window it considers that the message is lost and proceeds with corrective action (FIG. 6, step 224) which may consist of retransmitting the locally generated message several times. If the message is received during a subsequent window, then operation continues. If not, than a major fault is indicated and the system reinitializes.

In contrast to other protocols the token is not represented by a special transmission, but by the lack of a transmission starting 34 bits behind any message passing through the port. A port having a locally generated message (from I/O interface 30) for transmission, must monitor the bus for a passing message of another port. Once a message has been detected, the port waits for its end and then checks if another message follows. If another message does follow, the process is repeated. If not, then the port transmits its own message 34 bits after the end of the last of the messages. This sequence of synchronous messages is called a "message-train." Every port may add its message at the end of the passing message-train. If a message-train with small messages is present, the ring will contain several messages spread along its length.

The port having transmitted last in the message-train is the one holding the token. When its message comes back, and it is not followed by another message, the protocol forces the port to respond with a transmission which is issued 34 bits after its own message has been received. If the port has a message to transmit, it just transmits the message. If it does not, the port transmits a special short broadcast message to start a message-train.

The handshaking signals required by nonbroadcast messages, such as confirmation, repeat and port busy, are all packed in one broadcast message. This message must be transmitted at the end of the message-train that brought the messages requiring the response.

Every port may transmit only one message per message-train. The only exception is the handshaking response broadcast message, which is transmitted in addition to any other port's message.

In summary, a port, which receives its transmitted message back without another port's message behind it, has the responsibility of issuing a new message so that bus operation continues. This represents the engine of what is called a message train. This message can be either user's data, or an inter-port information message. It is transmitted following a 2-word interval (34 bits) from the end of its return message. Any other port having a message to transmit does so by placing it behind the last message of the passing message train at a distance of two data words (34 bits).

This protocol has been defined for the fastest response time and highest efficiency of the entire bus system. It is to maintain this speed that each port may transmit only one message per message train.

A 3-ring network supported by this protocol should be used when the ports may be separated into groups of functions, with each function requiring a fast response time. In this case, a port is used as a gate between every two rings by substituting for its user interface control a second medium access controller and a second bus interface unit. In this configuration the throughput delay from ring to ring is 510 to 700 nsec.

The overall system organization and the above protocol have been defined to eliminate the user's communication overhead and to permit almost instantaneous connection and disconnection of various devices having different interfaces and data rates.

On the other hand, if cost is the main consideration and loss of the forementioned advantages is tolerable, a subset of the port could be integrated into the user's hardware. In this case, the user interface control and data bus memory should be removed and the medium access controller and bus interface unit should be integrated with the user's hardware and software. A mixed bus system may also be supported. That is, some of the ports may be integrated in the user's hardware while other ports would remain in the stand-alone configuration.

Although shown and described in what is believed to be the most practical and preferred embodiment, it is apparent that departures from the specific design described and shown will suggest themselves to those skilled in the art and may be made without departing from the spirit and scope of the invention. I, therefore, do not wish to restrict myself to the particular construction described and illustrated, but desire to avail myself of all modifications that may fall within the scope of the appended claims.

I claim:

1. A bus interface unit for interfacing a serial bit data bus to a parallel bit data handing system, comprising
   a parallel to serial data converter for converting parallel data from said parallel bit data handing system to serial data;
   a parity tester responsive to the parity of said parallel data, said parity tester producing an output signal indicative of whether parity of the converted serial data is correct;
   a frame check sequence generator for generating a frame check sequence in response to content of said serial data and said output signal, said frame check sequence being correct if the parity of said data is correct and other than correct if the parity of said data is incorrect; and
   output means for outputting the serial data and the frame check sequence to said serial data bus.

2. A frame check sequence generator comprising:
   a plurality of shift registers for producting shifted output data, said shift registers including a first shift register and successive shift registers;
   an input data selector means for selecting input data for said first shift register;
   a successive data selector means for each of said successive shift registers, each successive data selector being for selecting data to be input to a next one of said successive shift registers, each successive data selector means having a first input for receiving said input data, and a second input;
   cross connecting means for each successive data selector means, said cross connecting means being for connecting shifted output data from one of said shift registers to said second input of a one of said successive data selectors associated with the next successive shift register: and
   control means responsive to shifted output data from a last of said successive shift registers for controlling said input data selector means and for controlling said successive data selector means to connect one of said input data and said shifted output data from a previous of said shift registers as input to one of said successive shift registers.

3. A bus interface unit for interfacing a serial bit data bus to a parallel bit data handling system, comprising
   a receiver means for acquiring serial data from said bus, said serial data containing a frame check sequence;
   a clock means for generating a clock signal at a frequency equal to a frequency of bits in said serial data;
   a clock processor means for receiving said serial data and said clock signal to generate a clock processor signal for processing said serial data;

a serial to parallel data conversion means responsive to said serial data and said clock processor signal for converting said serial data to parallel bit data;

an output means for outputting said parallel bit data to said parallel bit data handling system; and a frame check sequence tester responsive to said serial data and said clock processor signal for providing a validity output signal when said frame check sequence is recognized by said tester, said frame check sequence tester including a plurality of parallel path operating means and check means for using a cyclic redundancy code to determine validity of the serial bit data, said check means being a shift register circuit configured to implement the polynomial $$X^{16}+X^{12}+X^5+1,$$

said frame check sequence tester comprising a plurality of shift registers for producing shifted output data, said shift registers including a first shift register and successive shift registers, an input data selector means for selecting input data for said first shift register, a successive data selector means for each of said successive shift registers, each successive data selector being for selecting data to be input to a next one of said successive shift registers, each successive data selector means having a first input for receiving said input data, and a second input, cross connecting means for each successive data selector means, said cross connecting means being for connecting shifted output data from one of said shift registers to said second input of a one of said successive data selectors associated with the next-successive shfit register, and control means responsive to shifted output data from a last of said successive shift registers for controlling said input data selector means to connect one of said input data and said shifted output data from a previous of said shift registers as input to one of said successive shift registers.

4. The apparatus of claim 3, further comprising a parity generator for generating a parity bit representative of the parity of said parallel bit data.

5. The apparatus of claim 3, further comprising transmission means for placing said serial data received from same data bus back on said data bus, said transmission means comprising a timing control responsive to said clock signal for producing timing signals;

an output data selector responsive to said timing signals and said serial data for producing a serial data train; and a transmitter responsive to said serial data train for placing said data train on said serial bit data bus.

6. The apparatus of claim 3, further comprising a timing control responsive to said clock signal for producing timing signals;

an input means for receiving input parallel bit data from said data handling system;

a parallel to serial converter responsive to said timing signals and said input parallel bit data for converting said input parallel bit data into converted serial data; and a transmission means for placing said converted serial data on said data bus.

7. The apparatus of claim 6, further comprising a parity tester responsive to said timing signals and said input parallel bit data for testing the parity of said converted serial data and for providing a parity output indicative of whether said parity is correct.

8. The apparatus of claim 7, further comprising:

a frame check sequence generator responsive to said timing signals and said parity output, said frame check sequence generator being for generating a test word, said test word being correct if said parity is correct and incorrect if said parity is in error, and routing means for routing said test word to said transmission means so that said test word is placed on said data bus along with said converted serial data.

9. The apparatus of claim 8, wherein said frame check sequence generator comprises:

a plurality of shift registers for producing shifted output data, said shift registers including a first shift register and successive shift registers;

an input data selector means for selecting input data for said first shift register;

a successive data selector means for each of said successive shift registers, each successive data selector being for selecting data to be input to a next one of said successive shift registers, each successive data selector means having a first input for receiving said input data, and a second input:

cross connecting means for each successive data selector means, said cross connecting means being for connecting shifted output data from one of said shift registers to said second input of a one of said successive data selectors associated with the next successive shift register: and control means responsive to shifted output data from a last of said successive shift registers for controlling said input data selector means and for controlling said successive data selector means to connect one of said input data and said shifted output data from a previous of said shift registers as input to one of said successive shift registers.

10. The apparatus of claim 8, wherein said frame check sequence generator includes a coding means for impressing a cyclic redundancy code on said test word.

11. The apparatus of claim 10, wherein said coding means is configured to implement the polynomial:

$$X^{16}+X^{12}+X^5+1.$$

12. The apparatus of claim 6, wherein said transmission means comprises:

a timing control responsive to said clock signal for producing timing signals; and an output data selector responsive to said timing signals and said converted serial data for producing a converted serial data train for transmission by said transmission means.

13. The apparatus of claim 12, wherein said output data selector has an input for receiving said serial data from said receiver means, and a first forwarding means for forwarding said serial data to said transmission means.

14. The apparatus of claim 12, further comprising: a parity tester responsive to said timing signals and said converted serial data for testing the parity of said converted serial data and for providing a parity output indicative of whether said parity is correct.

15. The apparatus of claim 14, further comprising:

a frame check sequence generator responsive to said timing signals and said parity output, said frame check sequence generator being for generating a test word, said test word being correct if said parity is correct and incorrect if said parity is in error; and wherein said output data selector has a further input for receiving said test word, and means for forwarding said test word to said transmission means.

* * * * *

UNITED STATES PATENT AND TRADEMARK OFFICE
CERTIFICATE OF CORRECTION

PATENT NO.  : 4,827,477
DATED       : May 2, 1989
INVENTOR(S) : NAPOLEON G. AVANEAS

It is certified that error appears in the above-identified patent and that said Letters Patent is hereby corrected as shown below:

```
     Col. 3, line 8, "according" should be --according to the--
     Col. 4, line 61, "o" should be --of--
     Col. 6, line 3, "and" should be -- and unpacks for
the receiver the data with a few extra bits--
     Col. 14, line 3, "8." should be --7.--
            line 8, "9.." should be --9.--
            line 13, "MAX. RING" should be --INTERPORT
MAX. LINK--
     Col. 17, line 32, which is claim 3, "shfit" should be
--shift--
            line 35, which is also claim 3, "means" should
be --means and for controlling said successive data selector
means--
```

Signed and Sealed this

Sixteenth Day of June, 1992

*Attest:*

DOUGLAS B. COMER

*Attesting Officer*   *Acting Commissioner of Patents and Trademarks*